June 25, 1935.  E. S. CORNELL, JR  2,005,969
PIPE FITTING
Filed March 10, 1933  2 Sheets-Sheet 1
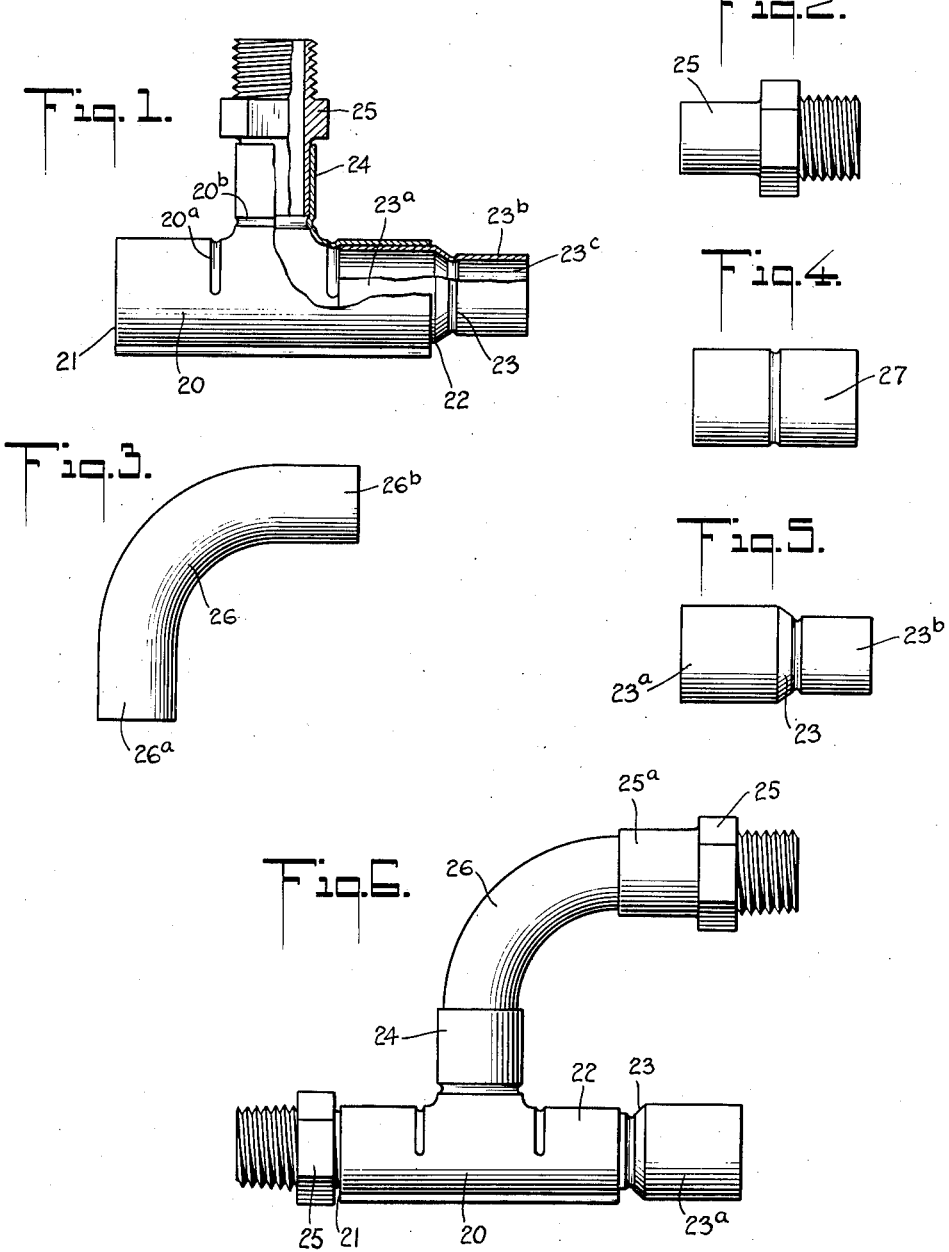

June 25, 1935.  E. S. CORNELL, JR  2,005,969
PIPE FITTING
Filed March 10, 1933  2 Sheets-Sheet 2
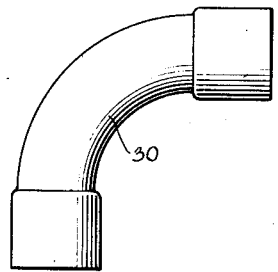
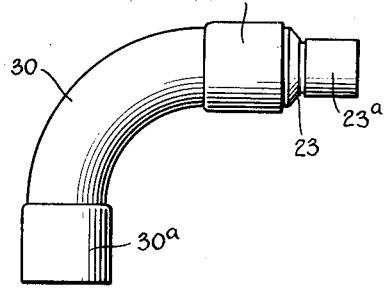
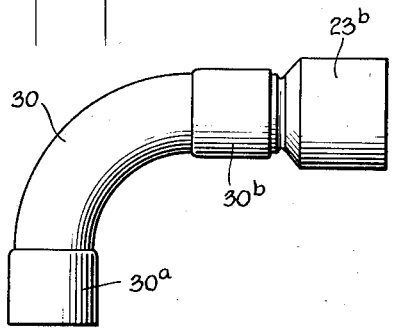
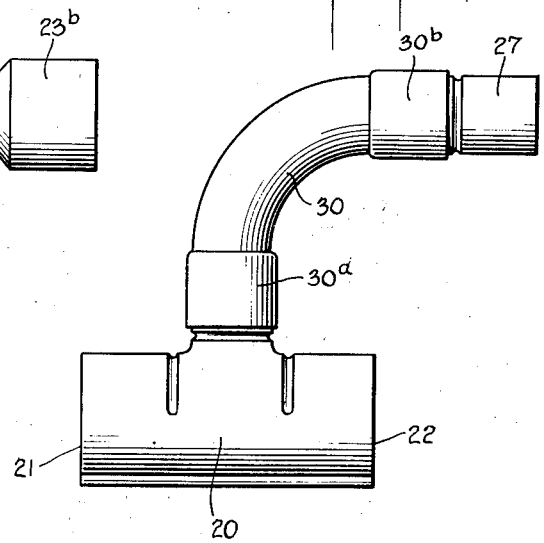
INVENTOR,
Edward S. Cornell, Jr.
BY
ATTORNEY.

Patented June 25, 1935

2,005,969

UNITED STATES PATENT OFFICE 2,005,969

PIPE FITTING

Edward S. Cornell, Jr., Larchmont, N. Y., assignor to American Radiator & Standard Sanitary Corporation, New York, N. Y., a corporation of Delaware Application March 10, 1933, Serial No. 660,228

1 Claim. (Cl. 137—75)

My invention relates to the method of interrelating fittings for pipes, tubes and the like, and the resulting combined structures.

My invention is directed to pipe fittings of integral wrought or sheet metal, such as copper, copper alloys and the like, the ends of which are arranged for internal and external telescoped connection by "sweated" joints, i. e., bonding by solder or other suitable medium which upon cooling effects a sealed and substantially rigid joint.

Pursuant to my invention, I provide, in essence, a set of T's which range in inner diameters of their respective body ends and the inner and outer faces of the lateral openings; a set of reducers which range in inner and outer diameters of their respective ends; a set of elbows which range in inner and outer diameter of their respective ends; a set of adapters, each adapter having its one end smooth at its inner and outer faces, the opposite end being threaded (for connection with a mated threaded end of a faucet, cock, etc.), which adapters range in selected inner and outer diameters; the diameters of the fittings being related to one another to provide for optional external and internal telescoped sweated connection of any two or more selectively with one another.

My invention has particular application to T's formed of wrought metal and of the sweated connection type, that is to say, that the body and lateral ends of the T are smooth, and accordingly not provided with threading.

Thus, for the assembly of any aforesaid T and one or more aforesaid adapters or the assembly of any aforesaid T and one or more aforesaid reducers and/or one or more aforesaid elbows, etc., as the case may be, there result virtual T's which have ranges of opening sizes at the respective opposite body ends and at the lateral openings, which provide for all possible combinations of fittings and pipe lengths connected and secured to one another by "sweated" joints, necessary or desirable for all plumbing purposes and also for connection with threaded or other heretofore types of fixtures, fittings, and the like, and accordingly for a complete range of regulation opening sizes accepted by the trade.

From a commercial viewpoint, my invention is particularly applicable to integral wrought or sheet metal T's of the forms set forth and claimed in my United States Letters Patent #1,850,049, dated March 15th, 1932, entitled Pipe fittings and method of making the same, such T's being preferably of wroght copper; the two body ends and the lateral end are provided with faces for sweated connection with a pipe, tube or other pipe fitting, the telescoped end of the T being substantially smooth throughout the area of the sweated connection, and therefore devoid of threading, the area of each telescoped connection being predetermined by the provision of a bead serving as a stop, the extent of such area affording a rigid connection upon completion of the sweated joint. Pursuant to certain phases of my invention applicable to the aforesaid and other integral metal types of T's, the three ends of the T's may be formed to have the same or different diameter openings at the respective inner and outer end faces.

In the commercial utilization of my invention, the one-end threaded adapters are dimensioned for the specific sizes and range of sizes accepted as standard by the trade.

The elbows may be of accepted angular types, e. g., of forty-five and ninety angular degrees, or of any special angular degrees.

The unions may have the same or different inner and outer diameters, at the respective end faces.

My invention attains advantages of eminent superiority, in that by assembly of the above stated pipe fittings with pipe ends and with one another, all possible combinations of connections necessary or desirable according to accepted trade practices, are had by a stock of the above stated parts, the number of individual parts of such stock being but a minor fraction of the number of stock parts required in the use of the regulation threaded or other heretofore types of T's, elbows, unions, adapters, etc., for any given opening sizes and given range of size dimensions.

Pursuant to the present trade practices, the fittings are more commonly of the threaded type and of material such as cast iron, cast brass, or the like; the present trade practice also includes T's having a cast or molded metal body portion and the T ends sweated to such body portion; the aforesaid are furnished to the trade in regular sizes of fittings, having opening sizes ranging from three-eights inch up at one-quarter inch size differences for the lower size range and onehalf inch size differences for the higher size ranges. Such prior T's are required to be stocked of the respective opening sizes for the range of opening size differences, as for example:

3/8"— 3/8" x 3/8" x 3/8"
3/8" x 3/8" x 1/4"
3/8" x 1/4" x 3/8"
3/8" x 1/4" x 1/4"
1/2"— 1/2" x 1/2" x 1/2"
1/2" x 1/2" x 3/8"
1/2" x 1/2" x 1/4"
1/2" x 3/8" x 1/2"
1/2" x 3/8" x 3/8"
3/8" x 3/8" x 1/2"
1/4" x 1/4" x 1/2"
3/4"— 3/4" x 3/4" x 3/4"
3/4" x 3/4" x 1/2"
3/4" x 3/4" x 3/8"
3/4" x 1/2" x 1/2"
3/4" x 1/2" x 3/8"
3/4" x 1/2" x 3/4"
1/2" x 1/2" x 3/4"
1"  —1"   x 1"   x 1"
1"   x 1"   x 3/4"
1"   x 1"   x 1/2"
1"   x 1"   x 3/8"
1"   x 3/4" x 1"
1"   x 3/4" x 3/4"
1"   x 3/4" x 1/2"
1"   x 1/2" x 1"
1"   x 1/2" x 3/4"
1"   x 1/2" x 1/2"
3/4" x 1/2" x 1"
1/2" x 1/2" x 1"
1 1/4"—1 1/4" x 1 1/4" x 1 1/4"
1 1/4" x 1 1/4" x 1"
1 1/4" x 1 1/4" x 3/4"
1 1/4" x 1 1/4" x 1/2"
1 1/4" x 1"    x 1 1/4"
1 1/4" x 1"    x 1"
1 1/4" x 1"    x 3/4"
1 1/4" x 1"    x 1/2"
1 1/4" x 3/4" x 1 1/4"
1 1/4" x 3/4" x 1"
1 1/4" x 3/4" x 3/4"
1 1/4" x 1/2" x 1 1/4"
1 1/4" x 1/2" x 1"
1"    x 1"    x 1 1/4"
3/4"  x 3/4"  x 1 1/4"
1 1/2"—1 1/2" x 1 1/2" x 1 1/2"
1 1/2" x 1 1/2" x 1 1/4"
1 1/2" x 1 1/2" x 1"
1 1/2" x 1 1/2" x 3/4"
1 1/2" x 1 1/2" x 1/2"
1 1/2" x 1 1/4" x 1 1/2"
1 1/2" x 1 1/4" x 1 1/4"
1 1/2" x 1 1/4" x 1"
1 1/2" x 1 1/4" x 3/4"
1 1/2" x 1 1/4" x 1/2"
1 1/2" x 1"    x 1 1/2"
1 1/2" x 1"    x 1 1/4"
1 1/2" x 1"    x 1
1 1/2" x 1"    x 3/4"
1 1/2" x 3/4" x 1 1/2"
1 1/2" x 3/4" x 1 1/4"
1 1/4" x 1 1/4" x 1 1/2"
1"    x 1"    x 1 1/2"
2"—2" x 2" x 2"
2" x 2" x 1 1/2"
2" x 2" x 1 1/4"
2" x 2" x 1"
2"—2" x 2" x 3/4"
2" x 2" x 1/2"
2" x 1 1/2" x 2"
2" x 1 1/2" x 1 1/2"
2" x 1 1/2" x 1 1/4"
2" x 1 1/2" x 1"
2" x 1 1/2" x 3/4"
2" x 1 1/2" x 1/2"
2" x 1 1/4" x 2"
2" x 1 1/4" x 1 1/2"
2" x 1 1/4" x 1 1/4"
2" x 1 1/4" x 1"
2" x 1" x 2"
2" x 1" x 1 1/2"
2" x 1" x 1"
2" x 3/4" x 2"
2" x 3/4" x 1 1/2"
2" x 1/2" x 2"
1 1/2" x 1 1/2" x 2"
1 1/4" x 1 1/4" x 2"

Totaling the above:—

| Size | Number |
|---|---|
| 3/8" | 4 |
| 1/2" | 7 |
| 3/4" | 7 |
| 1" | 12 |
| 1 1/4" | 15 |
| 1 1/2" | 18 |
| 2" | 24 |
| Total | 87 T's |

Pursuant to my invention the total of but seven T's are required as stock, the range of opening sizes of the respective body end and lateral openings being afforded by the conjoint use of interrelated fittings, as more fully appears hereinafter.

Further features and objects of the invention will be more fully understood from the following detail description and the accompanying drawings, in which Fig. 1 is a side elevation, partly broken away, in vertical section, showing a T of integral metal, a reducer at one body end and an adapter at the lateral end for yielding desired specific diameters at the respective body ends and the lateral by means of the interrelated fittings;

Fig. 2 is a side elevation of a male type of adapter;

Fig. 3 is a side elevation of an elbow;

Fig. 4 is a side elevation of a coupling;

Fig. 5 is a side elevation of a reducer;

Fig. 6 is a side elevation showing interrelated T, an adapter at one body end, a reducer at the other body end, and an elbow and internally telescoped male adapter at the lateral;

Fig. 7 is a side elevation of a double cupped elbow;

Fig. 8 is a side elevation of the elbow of Fig. 7 combined with a reducer providing a reduced end opening;

Fig. 9 is a side elevation of the elbow of Fig. 7 with a reducer providing an enlarged end opening; and Fig. 10 is a side elevation of a T having the elbow of Fig. 7 connected at its lateral and a coupling connected to the free end of the elbow.

In setting forth the various advantages of my invention, it will be understood that the specific sizes of bore of the body ends and the lateral of the specific types of T's may be selected as desired, the bore sizes of the elbows of the various types, of the reducers of the various types, of the adapters of the various types, the aforesaid having their respective ends smooth and arranged for either interior or exterior telescoped relation. The threaded end of any adapter may be either of the male or female type. The mathematical fractional proportional part of the number of such interrelated fitting embodying my invention as compared with the number of various sized individual fittings having the specific sizes of openings, is therefore dependent upon the specific opening sizes and the range of sizes of the respective fittings.

In the following out the general principle of my invention, the assembly of the interrelated fittings illustrated in Fig. 1 comprises a T 20 of integral wrought or sheet metal, preferably of the construction and/or formed pursuant to the method described in my aforesaid United States Patent No. 1,850,049; the bore, i. e. internal diameter, of the body opening 21 we will assume is "m". At the other body opening 22 is secured by sweated joint connection a reducer 23, the outer diameter of its illustrated enlarged end 23a being telescoped interiorly relative to the bore of the body end 22. I will denote the outer diameter of the reduced end portion 23b as "n" and its inner diameter, that is the diameter of the inner face 23c as "o". In the status as thus described, I have the original T 20 having its normal opening sizes for its body ends and any desired normal interior and exterior sizes of its lateral 24, and upon sealing-in the reducer 23, I then have a resulting virtual T which has the normal bore "m", i. e., inner diameter at its body end 21, two diameters "n" and "o" respectively of the outer and inner diameters of the opposite smooth faced ends 23b, 23c of the reducer 23; and the inner and outer diameters of the opposite smooth faced ends of the lateral 24.

The adapter 25 illustrated as connected telescopically interiorly relative to the inner bore of the lateral 24, is shown in side elevation in Fig. 2.

The reducer 23 illustrated as sweat jointed telescopically interiorly within the right body end of the T 20 is illustrated in side elevation in Fig. 5.

In Fig. 6, another form of interrelated fitting respectively sweat-fitted to the T 20, of Fig. 1, but of relatively reduced bore sizes, is illustrated; like parts are designated by like reference characters. In the assembly shown in Fig. 6, is included the smooth elbow 26 which is illustrated individually in side elevation in Fig. 3. The end 26a is shown sweat-fitted telescopically interiorly relative to the lateral opening 24 and the end 26b of the elbow 26 is sweat-fitted telescopically interiorly relative to the smooth face 25a of the adapter 25. In the status thus described, there is a resulting virtual T having equal bores at the body ends, that is to say, the bores of the original body ends and a modified bore (and in this instance a threaded end and projecting in a direction different from the lateral of the T itself) of any of an optional sized diameter.

Further T size opening is had by telescopically interiorly seating the reduced end 23b of the reducer 23 within the right-hand body end 22 of the T 20, thus giving a further virtual T construction of different size, firstly, as compared with the original T of Fig. 6, and secondly, as compared with the above described elbow 26-adapter 25.

A further different sized T is had by sweated connection of the smooth end of the adaptor 25 within the body end opening 21; this adapter 25 is illustrated of different, i. e., smaller dimension than the adapter 25 connected to the free end of the elbow 26, in Fig. 6.

Thus by means of the adapter 25 at the body end 21, I provide for a different sized (and in this instance with a threaded end) of T as compared, firstly, with the original T; secondly, as compared with the original T and the reducer 23; and thirdly, as compared with the elbow 26-adapter 25 connected to the lateral 24.

In Fig. 7 is illustrated an elbow 30 having cupped ends, the inner and outer faces of which are smooth and arranged for external and internal telescopic sealed connections. In Fig. 8, the elbow 30 is shown assembled with an interfitted reducer 23, in this instance, the cupped end 30b being connected telescopically exteriorly relative to the enlarged end 23a of the reducer 23. In Fig. 9, the elbow 30 is shown connected telescopically exteriorly at its end 30b to the reducer 23, in this instance to the reduced end 23a of the reducer 23, the enlarged end 23b of the reducer 23 being free.

In Fig. 10, the assembly is that of the T 20 having the elbow 30 connected to its lateral and the connector 27 secured telescopically interiorly to the cupped end 30b of the elbow 30.

In a like manner, the above described various items of fittings may be assembled in interrelated dimensional parts either for interior or exterior telescoped sweated joint connection.

Accordingly, there results the high commercial advantages that with the system of integral T having smooth connection ends and the above referred to combinable sweat connected fittings other than the T, the resulting combined sweat connected fittings may be built up from a relatively small number of individual fittings.

From another aspect, it is apparent that I have provided a method of interrelating fittings for pipes, tubes and the like by associating with a T having smooth connection ends of any given bore of its opposite body end openings and optionally selected inner and/or outer bore of its lateral, a set of interrelated dimensioned reducers, adapters, elbows and the like, whereby the resulting virtual T's have a selected range of opening sizes.

By such method of interrelating the fittings, the stock of fittings for all possible dimensional requirements and forms of fitting and assembly of fittings per se, leading from a supply pipe to any desired number of other pipes, fixtures, etc., under the present and other approved practices recognized in the plumbing trade, is reduced to a minimum which is but a minor fraction of the number of fittings required under present practice.

From a further aspect, my invention provides for a system constituted of a selected set of integral T's having smooth connection ends, a selected set of adapters, a selected set of elbows, a selected set of reducers, a selected set of connectors, etc., the selection being based on the interrelation of the various interchangeability of bore, that is, diameters, inner and/or outer as the case may be for external and internal telescoped sweat connection, whereby all possible requirements under the plumbing trade are successfully met with by a total number of such fittings which is markedly less than those required by present day fittings.

Applying the above principle to specific examples based on present day accepted practice, a minimum stock of T's, 90° elbows, 45° elbows, unions (including reducers), male adapters and female adapters, each of the aforesaid being arranged for telescoped sweated connection with one another over smooth end faces of substantially uniform diameter, the following would constitute a complete stock—

*T's—Lateral openings*

| Body end openings | 3/8" | 1/2" | 3/4" | 1" | 1 1/4" | 1 1/2" | 2" |
|---|---|---|---|---|---|---|---|
| 3/8" | X | | | | | | |
| 1/2" | | X | | | | | |
| 3/4" | | | X | | | | |
| 1" | | | | X | | | |
| 1 1/4" | | | | | X | | |
| 1 1/2" | | | | | | X | |
| 2" | | | | | | | X |

There is required, therefore, pursuant to the present invention but the total of seven T's of the above stated sizes of openings and range of opening sizes, assuming like opening sizes at the respective body ends and the lateral.

By like token, for a minimum stock, pursuant to the invention, there would be required, for the above stated sizes of openings and range of opening sizes, the following supplemental fittings, assuming each fitting to have like opening sizes at the respective ends:

| Fitting | Number |
|---|---|
| 90° elbows | 7 |
| 45° elbows | 7 |
| Female to female unions | 7 |
| Male to female unions | 7 |
| Female copper-male adapters | 7 |
| Male copper-male adapters | 7 |
| Female copper-female adapters | 7 |
| Male copper-female adapters | 7 |
| Total | 56 |

Comparing the above, attained by the present invention, with the usual stock, for the above stated regulation opening sizes, for T's, as listed hereinabove:

*T's*

| Size | Number |
|---|---|
| 3/8" | 4 |
| 1/2" | 7 |
| 3/4" | 7 |
| 1" | 12 |
| 1 1/4" | 15 |
| 1 3/4" | 18 |
| 2" | 24 |
| Total | 87 |

Pursuant to my invention, the above stated two types of elbows, the above stated female to female unions and male to female unions, the female-male adapters and male-male adapters and the female-female adapters and male-female adapters, each having its opposite openings of uniform diameter, totaling in the above assumed range of opening sizes from 3/8" to 2", both inclusive, at 1/4" differences are interrelated with one another and with the above stated seven sizes of T's and provide for all requirements under present trade practice.

In like manner, the total stock of fittings under the present invention required to be kept by jobbers, and in turn plumbers, is of reduced number, as compared with fittings pursuant to present and heretofore proposed practice.

As appears from the above, my invention provides for virtual T's of varied range of diameters of selected sizes for the respective body and openings and for the lateral opening, by providing a minimum number of individual T's and combining therewith a multiple of different diametered coordinating fittings, i. e., elbows, adapters, reducers, unions, etc., each said coordinating fitting having at one of its ends a smooth face of substantially uniform diameter related to the diameter of either the smooth inner face or the smooth outer face of an opening of the T, to provide a clearance of a magnitude to effect capillary and/or surface flow of the bonding medium serving to effect the sweated connection therewith.

The advantages attending my invention are applicable for all forms of pipes, tubes and to the various trades appertaining thereto.

My invention is also applicable to T's of wholly integral construction, of copper or copper containing alloy or other suitable material, a preferred embodiment of which is set forth and is claimed in my copending application entitled Method of producing metal bodies, Serial No. 661,489 filed March 18, 1933, a distinctive feature of which is the provision of smooth faces of uniform bore respectively externally as well as internally at the opposite body ends, and also smooth faces externally and internally at the lateral opening. T's of this construction may be substituted wholly or a part for T's of the construction embodied by my aforesaid Patent #1,850,049.

Whereas I have described my invention by reference to specific forms thereof, it will be understood that many changes and modifications may be made without departing from the spirit of the invention.

I claim:

As an article of manufacture, a wrought metal fitting having a wall thickness which precludes threading and adapted to receive couplings designed for either threaded connection or sweated connection with pipe sections or for direct connection with the pipe sections themselves, said fitting being constructed and arranged to receive and have sweated thereto a pipe section either inside or overlying the outside of the fitting ends.

EDWARD S. CORNELL, Jr.